United States Patent
Koren et al.

[11] Patent Number: 5,943,750
[45] Date of Patent: Aug. 31, 1999

[54] RECONFIGURABLE MACHINE TOOL

[75] Inventors: Yoram Koren, Ann Arbor; Sridhar Kota, Brighton, both of Mich.

[73] Assignee: The Regents of the University of Michigan, Ann Arbor, Mich.

[21] Appl. No.: 08/997,140

[22] Filed: Dec. 23, 1997

[51] Int. Cl.$^6$ .................................................. B23B 39/00
[52] U.S. Cl. ................... 29/26 A; 29/50; 29/53; 408/88; 408/237; 409/202; 409/212; 409/213; 409/217; 409/235
[58] Field of Search .................................... 29/26 A, 566, 29/50, 52, 53; 409/201, 202, 203, 204, 212, 213, 217, 235; 408/88, 236, 237

[56] References Cited

U.S. PATENT DOCUMENTS

| | | | |
|---|---|---|---|
| 2,081,288 | 5/1937 | Armitage | 409/212 |
| 2,393,696 | 1/1946 | Kraut et al. | 409/212 |
| 2,876,650 | 3/1959 | Sangster | 409/145 |
| 4,046,057 | 9/1977 | Imamura | 409/201 |
| 4,187,601 | 2/1980 | Aldrin | 409/201 |
| 4,218,815 | 8/1980 | Cumming . | |
| 4,229,866 | 10/1980 | Berthier | 29/26 A |
| 4,679,295 | 7/1987 | Lopez . | |
| 4,737,611 | 4/1988 | Humblot | 29/26 A |
| 4,858,301 | 8/1989 | Galarowic | 409/201 |
| 4,987,668 | 1/1991 | Roesch | 409/145 |
| 5,181,898 | 1/1993 | Piotrowski . | |
| 5,238,340 | 8/1993 | Ochiai et al. | 409/201 |
| 5,848,458 | 12/1998 | Bullen | 409/202 |

*Primary Examiner*—Daniel W. Howell
*Assistant Examiner*—Christopher Kirkman
*Attorney, Agent, or Firm*—Harness, Dickey & Pierce, LLC

[57] ABSTRACT

In accordance with the teachings of the present invention, a machine tool assembly is easily reconfigurable to perform single or multiple machining processes on a workpiece so that this machine has exactly the functionality required to perform a given set of machining tasks. The invention allows rapid changes in the machine structure and rapid conversion of the machine by relocating its basic building blocks. The assembly secures a raw workpiece to a table and includes support units that carry at least one single-axis spindle unit. The spindle units are easily attached to one of the support units and are easily movable thereon to perform machining processes from various positions and orientations relative the workpiece. A cutting tool, or other machining tool, is secured to each spindle, which is computer controlled to rotate the tool and stroke it linearly along its axis of rotation. The support units are reconfigurable and can be easily relocated to different positions and orientations about the workpiece.

19 Claims, 2 Drawing Sheets

RECONFIGURABLE MACHINE TOOL

This invention was made with government support under grant no. EEC-9259125 awarded by the National Science Foundation. The government has certain rights in this invention.

BACKGROUND OF THE INVENTION

1. Field of the Invention

The present invention relates to a machine tool assembly for machining a family of parts, and in particular, a low cost reconfigurable machine tool that is easily converted to perform a variety of machining operations.

2. Description of the Prior Art

Machine tools for cutting, drilling, tapping, milling or grinding a part from a raw material workpiece are typically dedicated machining lines (DML) or computerized-numerically-controlled (CNC). DMLs are customized hardware lines that can control multiple cutting tools in fixed directions, which are determined at the design stage of the part. They are generally designed to produce a single product and cannot be easily changed.

In DML's, parts that are machined from raw materials are typically made by a series of machining station which require the part to be transferred from one machining station to the next. Each tool performs a different operation on the part, which is then moved on to the next machining station until the machining process is complete. Each of these machining stations is designed and made to process the desired part and generally cannot be easily adapted to perform a different process on another part. Therefore, such a series of machining stations are appropriate for high volume parts, where the costs of the multiple tools and complexity in setting up the series of machining stations can be offset by the high volume of parts produced. However, such systems are not appropriate where a variety of parts are desired so that the additional costs to set up the system cannot be justified.

On the other hand, CNC machines include cutting tools where each machine operates one tool that is operable along several axes of motion and can thus produce a variety of parts. However, not all of these axes of motion are utilized during the production of each individual part. Furthermore, the structure of the CNC machine itself cannot be changed.

By contrast, the object of the present invention is to allow rapid changes in the machine structure and rapid conversion of the machine by relocating its basic building modules. This also allows the performance, on the same basic machine, of a variety of machining processes (such as milling, turning, grinding, etc.) and to machine a variety of part geometries with a small number of controlled axes-of-motion.

The reconfigurable machine of the present invention uses some principles of modular machine tools, but existing modular machine tools are not reconfigurable, nor they can be quickly converted to perform a variety of machining processes as described in the embodiments below. For example, U.S. Pat. No. 4,679,295 describes a modular machine tool for a specific process-machining of parts in a bar. This patent is limited to the design of a machine for machining from a bar.

U.S. Pat. No. 4,218,815 deals with modular transfer machines and is limited to a line consisting of a series of work stations, and does not deal with a single machine. The concept of modularity in this patent is very limited. By contrast the object of the current invention is to implement the concept of spindle-units driven on linear slides as basic modules that can be quickly attached at various locations on reconfigurable support units in order to perform a variety of machining operations.

The advantage of the reconfigurable machine of this invention is that it permits easy reconfiguration of the structure of the machine and its spindle-units to machine a new series of parts belonging to the same part family. It permits reduction in the cost of the machine since it does not have axes-of-motion that are not utilized for the machining of a particular part. The reconfigurable machine rather combines active degrees-of-freedom (driven by motors or other actuators) with passive degrees-of-freedom (manually reconfigured) to achieve "customized flexibility".

Another advantage of the reconfigurable machine of this invention is the possibility of using several tools such that their motion is simultaneously controlled by a computer, thereby combining advantages of DMLs and CNCs. Work stations in dedicated lines can take advantage of using multiple tools that cut the part simultaneously (each group of tools in one direction of motion), thereby achieving high productivity. On the other hand, CNC machines use a single tool that can be manipulated in different directions.

By contrast, the reconfigurable machine of this invention allows the use of several tools that cut simultaneously, thereby increasing the productivity to the level achieved by DMLs. The enhanced productivity achieved with the reconfigurable machine is an important economic benefit. The reconfigurable machine provides the right balance between production speed of DMLs and general flexibility of CNCs.

An additional advantage of the reconfigurable machine of this invention is that it allows the conversion of the machine to do various types of machining operations (i.e., processes), such as drilling, milling, turning, and grinding. On current machine tools all these types of operations cannot be performed on the same machine.

Another cost advantage of the reconfigurable machine is the light structure that reduces the cost associated with heavy metal bases utilized in traditional machines.

It is therefore a primary object of the present invention to fulfill that need by providing a reconfigurable machine tool that is cost effective, highly productive, and is capable of producing desired parts with minimal set up time and costs.

It is another object of the present invention to provide a machine tool that is easily reconfigurable to perform multiple operations in the machining of a family of parts.

It is a further object of the present invention to provide a machine tool that can be easily converted to do various types of machining operations.

It is another object of the present invention to provide a machine tool that has a light structure, yet still provides adequate rigidity in supporting the part so that tight design tolerances are met.

It is yet another object of the present invention to achieve high productivity by using several computer controlled tools to cut or otherwise machine the part simultaneously.

SUMMARY OF THE INVENTION

The objects of this invention are accomplished by providing a reconfigurable machine tool that has multiple support units that support the desired tools, each of which is easily reconfigurable so that the machine tool is capable of performing a variety of machining processes on a family of parts.

The present invention provides for a machine tool assembly that includes a base, a table, at least one support unit and at least one spindle unit. The base has several slots or holes positioned in a generally circular orientation around the table, which is positioned at approximately the center of the base and may be movable either horizontally or vertically, or may be tilted or angled so that it is non-parallel with the base. A part is secured to the table to hold it stationary as it is processed.

The machining spindles are mounted to the support unit and may be positioned at any location along each support unit. Each support unit is mounted to the base of the tool assembly through one or more of the slots or holes located about the base, and is easily and accurately movable by mounting the support unit to the base through a different set of slots or holes. This allows for customized flexibility and easy reconfiguration of the machine tool, thereby accomplishing a greater number of processes by increasing the number of orientations for the axis of motion for each spindle unit. Each spindle unit can also be quickly and easily removed and replaced to convert the machine to perform various types of machining operations, such as drilling, milling, turning, and grinding.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
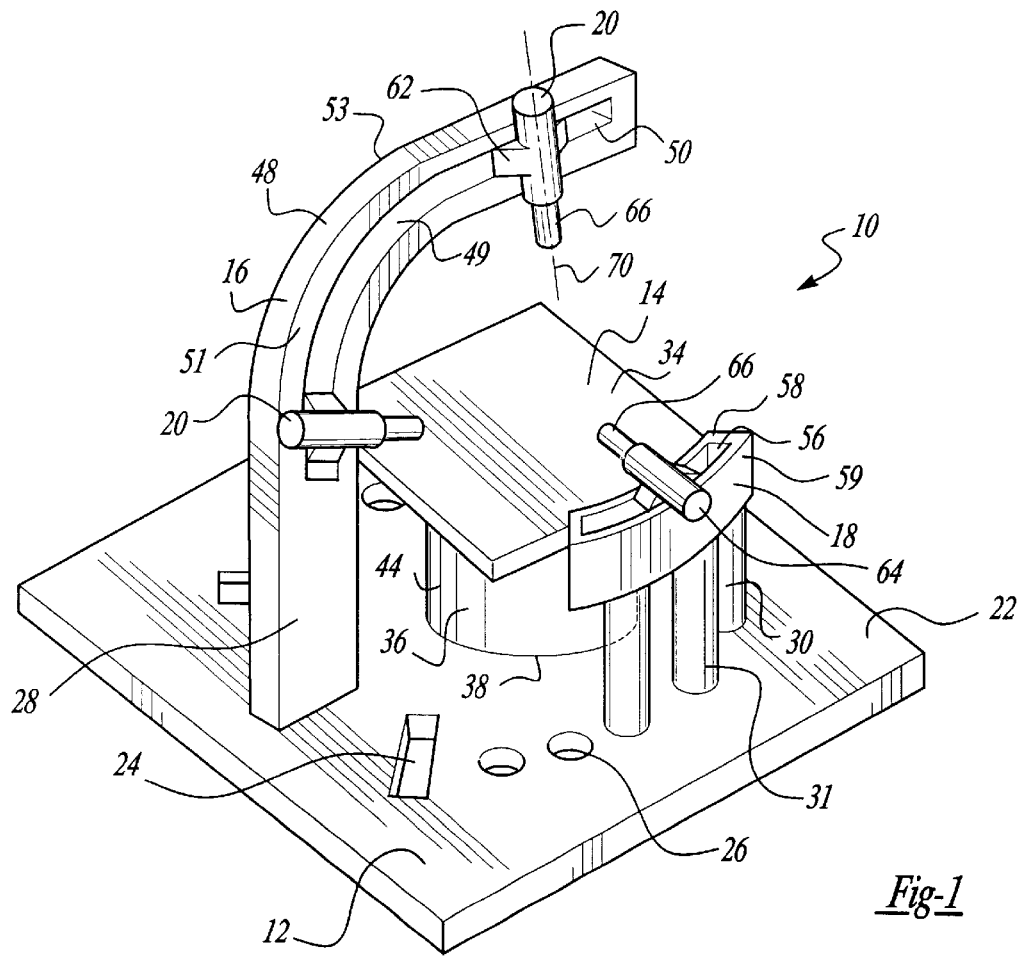
FIG. 1 is a perspective view of the preferred embodiment of the present invention.

Referring now in detail to the drawings, there is shown in FIG. 1 a machine tool assembly according to this invention, shown generally as 10. The preferred embodiment of the machine tool assembly 10 includes a base 12, a table 14, two support units 16 and 18, and at least one spindle unit 20. When assembled and operated, many of the components may be set or moved relative the base 12 to provide multiple degrees of freedom in which the spindle units can move relative a workpiece or raw part 21 (shown in FIG. 2) that is to be machined. These manual reconfigurations are made and set prior to operation of the assembly, thereby adding passive degrees of freedom to the assembly, while others movements may be driven by motors (not shown) during operation, thereby adding active degrees of freedom. The end result is an assembly 10 that combines these degrees of freedom to achieve customized flexibility for each process to be performed.

Figure 3:
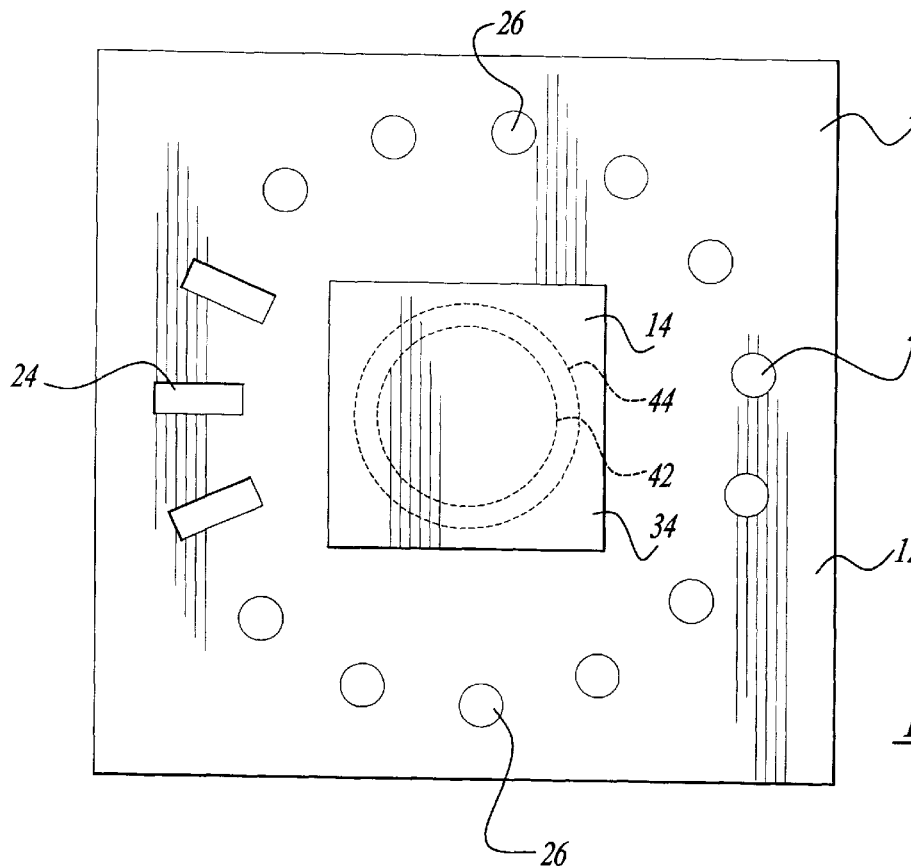
FIG. 3 is a top view of only the base and table.

The base 12 of the machine tool assembly 10 has a generally flat upper surface 22, and includes several rectangular locator slots 24 and circular locator apertures 26 positioned in a generally circular orientation around the base 12. This is best shown in FIG. 3. The shape of the locator slots 24 and apertures 26 may vary depending on the shape of the corresponding leg portions 28 and 30 of the support units 16 and 18, respectively, as discussed below.

Figure 4:
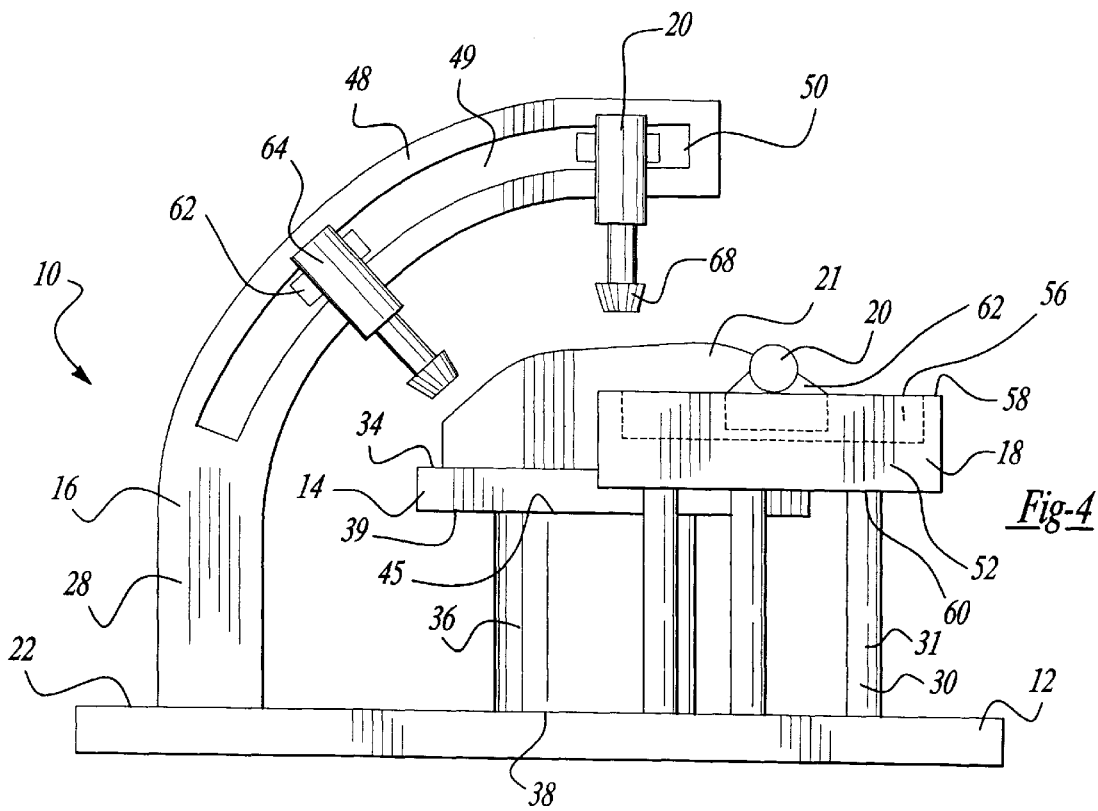
FIG. 4 is a side view of the assembly.

The table 14 generally has a flat top 34, which in one embodiment is mounted atop a column 36. The column 36 is secured to the base 12 at its lower end 38, and is generally centered with respect to the slots 24 and apertures 26 on the base 12. In the embodiment, the table 14 may be movable either horizontally or vertically relative to the column 36, which is accomplished by either sliding the table 14 relative to the column 36 along a track or wheel (not shown) in the bottom 39 of the table 14 or on top of the column 36, or by any other method to accomplish relative horizontal movement, such as an extension on one part sliding along a groove, or inserting an extension on the column into different corresponding apertures in the table. The column 36 may also be telescopic, or otherwise capable of providing for vertical movement of the table, by allowing an inner portion 42 of the column to slide into an outer portion 44, as best shown in FIG. 4. The desired height of the table 14 may then be mechanically locked. The telescopic column 36 also allows the table 14 to be easily rotated relative the base 12 to provide additional movement of the workpiece 21. Furthermore, the table 14 may also be pivotable about a joint (not shown) at the top 45 of the column 36 to allow the table 14 to be angled relative the base 12 for further flexibility in setup of the assembly.

Each of the movements of the table 14 relative to the base 12 may be manually set and secured prior to operation of the assembly, thereby providing additional passive degrees of freedom to the assembly or actuated by linear actuators. Because the table is manually reconfigured prior to operation and is not driven by separate motors, both the assembly and set up costs of the table are greatly reduced. However, it is clearly within the scope of the present invention to include one or more motors that are capable of adjusting the horizontal position, height, rotation, or angle of the table 14 during the machining process, thereby increasing the active degrees of freedom of the system.

In another embodiment (not shown) table 14 may be allowed to pitch, roll and/or yaw via linear actuators connected in parallel and each attached to the bottom of the table at one end and to the base at the other end. These actuators would be attached to the table and base with joints allowing angular motion, such as ball-and-socket or universal joints, etc.

The preferred embodiment includes two different support units, a vertical or column support unit 16 and a horizontal support unit 18. The column support unit 16 has a vertical leg portion 28 and a curved body portion 48 which includes a curvilinear groove or other guideway 50 located along one or both of its side surfaces 51 and 53. The body portion 48 is curved such that it extends over the table 14 in a semi-circular path 49 along a generally vertical plane. The path 49 is generally centered about the table 14. The leg portion 28 inserts into one of the slots 24 in the base 12 to secure the column support unit 16 thereto. Flexibility is increased by this design because the leg portion 28 may be inserted into different slots 24 to provide a different arcuate path over the table 12, along which one or more spindle units 20, discussed below, may be installed. To allow further flexibility of the assembly, the leg portion 28 may rotate either around a pivot or shaft (not shown) located in the base 12, which then creates an arcuate path over the table 12 along a non-vertical plane. These additional flexibilities are again additional passive degrees of freedom, as they are manually set prior to operation of the assembly 10.

The horizontal support unit 18 also includes a body portion 52 and a leg portion 30. The body portion 52 is curved and includes a groove or guideway 56 formed along a curvilinear path along its upper surface 58. The leg portion 30 includes at least one vertical leg 31, which is secured to the lower surface 60 of the body portion 52 and inserted into the locator apertures 26 in the base 12, so that the groove 56 extends in an semi-circular arcuate path 59 which is generally centered about the table 14. In the preferred embodiment, there are three such legs 31 to prevent rotation of the horizontal support unit 18 and provide additional rigidity to the support unit 18. As with the column support unit 16, the horizontal support unit 18 can also be manually reconfigured by inserting the leg portion 30 into the base 12 into a different set or combination of locator apertures 26, again increasing the passive degrees of freedom for the assembly 10.

Figure 2:
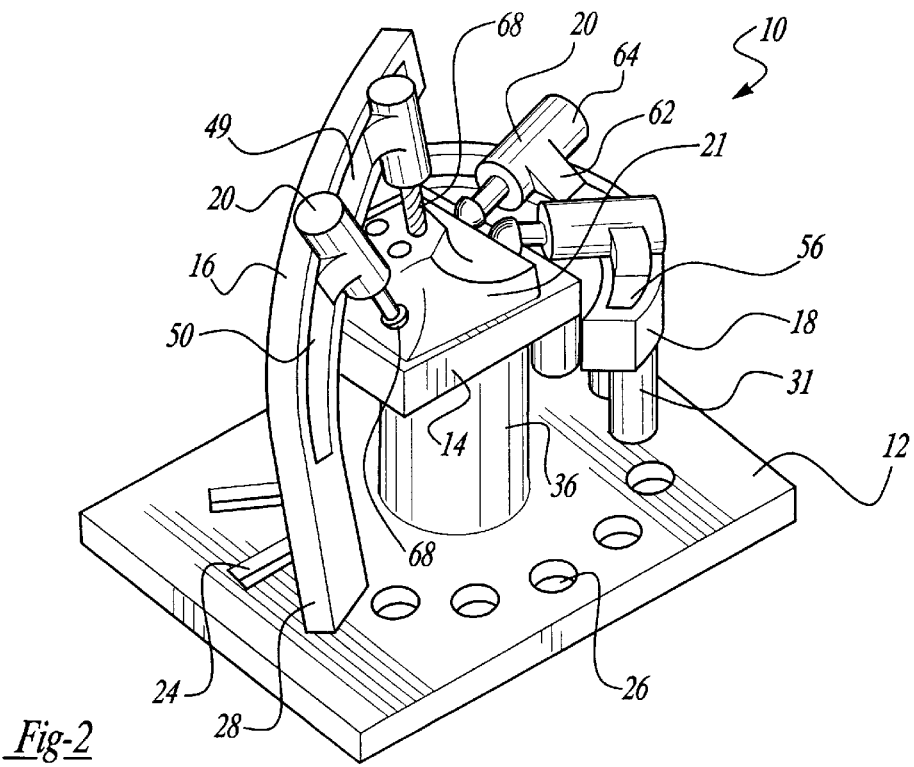
FIG. 2 is a perspective view of the present invention showing a different configuration and including a sample part being processed.

The spindle units 20 are attached within the grooves 50 and 56 of the support units 16 and 18, respectively. As shown in FIG. 1, there are three such spindle units 20. However, there may be more or less than three spindle units 20 depending on the processes the assembly 10 is set up for. The spindle units 20 are secured within their respective grooves 50 and 56 by a locking device 62 that prevents the spindles 20 from moving along the grooves 50 and 56 and further prevents the spindles 20 from dislodging from the grooves 50 and 56 during operation. The grooves 50 and 56 are formed to correspond with the shape of the locking device 62 which allows the locking device 62 to slide along the grooves 50 and 56 and be secured at any point along the semi-circular path formed by the grooves 50 and 56. Alternately, the support units may have slots extending along their body portions that allow the locking device to extend through the support unit and be secured from the opposite side. The locking device 62 is easy to disengage from the grooves so that the spindle units 20 may be quickly and easily detached from or moved along the grooves 50 and 56 to different locations with respect to the table 14. Additional spindle units 20 may also be easily installed within the grooves 50 and 56. For example, FIG. 2 shows four such spindle units.

Each spindle unit 20 has a motor 64 and a single axis rotating end 66 that is driven by the motor 64. A tool or other means 68 for cutting, drilling, milling or otherwise machining the workpiece 21 is secured to the rotating end 66. These tools 68 are then controlled by the spindle unit 20 and stroke or move linearly along the axis of rotation 70 of the spindle unit 20 while they rotate. Instead of a single tool 68, a modular tool magazine (not shown) may be added to each spindle unit 20. This magazine, which may be a drum, chain, or cartridge with a small number of tools, can be expanded and reconfigured to have the required number of tools and desired positions needed for a specific application.

After a design is completed and the necessary machining processes or series of processes have been developed, the raw workpiece 21 is secured to the table 14 in preparation for the first process. Additionally, the column support unit 16 and the horizontal support unit 18 are inserted into the appropriate locator holes 24 and 26. The appropriate tools 68 are attached to the spindle units 20, which are then installed so that their axes 70 are aligned with the workpiece 21. Once this initial setup of the assembly 10 is completed, the first machining process is performed on the raw workpiece 21. The initial configuration of the assembly 10 is set up to perform only processes that can be accomplished by axial movement of the tools 68 as they rotate and by horizontal and vertical movement of the table 14 (if controlled by a motor). Therefore, the present invention permits reduction in cost since it does not include axes of motion that are not utilized during the machining of a particular part process or series. The reconfigurable machine tool assembly 10 combines the active degrees of freedom driven by the motors with the passive degrees of freedom that are manually reconfigured to achieve the necessary customized flexibility required for each step in the machining process. These active and passive degrees of freedom are combined in a series or parallel manner. One or more passive degrees of freedom can be coupled to one or more active degrees of freedom to produce the desired results.

Upon completion of the first series of machining operations, the assembly 10 can easily be reconfigured for the subsequent series by moving the support units 16 and 18 to other locator slots 24 and apertures 26, which provides discrete location fixing; and moving the spindle units 20 along the grooves 50 and 56, which provides continuously variable position fixing. As stated above, the spindle units 20 can also be easily converted by replacing one tool 68 with another that accomplished a different process. This easy reconfiguration allows rapid changes in the machine structure and rapid conversion of the machine assembly by simply relocating its basic building modules. This also allows the machine assembly 10 to perform a variety of machining processes and to machine a variety of part geometries with a small number of controlled axes of motion. Because the workpiece 21 is fixed to the table 14 and the support units 16 and 18 are rigidly secured to the base 12, sufficient rigidity of the assembly 10 is achieved to meet tight design tolerances. The two or more support units 16 and 18 also allow machining processes to be performed in multiple planes simultaneously, instead of the current method of aligning single axis machining units on opposite sides of a workpiece so that the machining process can only be performed in one plane or in parallel planes during a specified process. The spindle units along the column support unit 16 perform tasks in the vertical plane, or in a plane offset from vertical if a pivot or shaft is utilized, while the spindle units along the horizontal support unit 18 simultaneously perform tasks in the horizontal plane.

The present invention also allows the use of several tools 68 that operate simultaneously, thereby increasing the productivity, and thus the economic benefit, of the assembly. The end result is that the assembly 10, including all possible configurations, can access more points on a part than a five-axis CNC machining center, and has higher productivity than a single-tool CNC machine. This is accomplished at a greatly reduced cost because the present invention does not have the general flexibility of a five-axis CNC machine, but rather has only customized flexibility to accommodate geometric and machining peculiarities of each part to be processed.

An alternate embodiment (not shown) of the present invention includes a spindle unit that is equipped with a chuck, rather than a tool, that holds and rotates a workpiece. A cutting tool is attached to the table and moves in a direction parallel to the axis of the spindle to perform a turning operation. The cutting tools of other spindles may also engage in the cutting of the rotating part to cut profiles on the rotating part.

While the above description constitutes the preferred embodiment of the present invention, it will be appreciated that the invention is susceptible to modification, variation and change without departing from the proper scope and fair meaning of the accompanying claims.

We claim:

1. A machine tool assembly for machining a family of workpieces, said machine tool assembly comprising:

a base having a top surface;

means for securing the workpieces relative to said base;

at least one support unit having a curvilinear body portion and a leg portion, said support unit removably attachable to said base in a plurality of locations on said top surface so that said machine tool is easily reconfigurable to perform multiple operations on the workpieces; and at least one spindle unit, said spindle unit being movably attachable to said support unit so that said spindle unit is movable to other locations along said support unit, said spindle unit including means for performing a machining process, said spindle unit being computer controlled to perform the desired machining process on the workpiece.

2. The machine tool of claim 1, wherein said securing means includes a table having a table surface and a support column, said support column being secured to said top surface of said base.

3. The machine tool assembly of claim 2, wherein said table surface is movable relative to said base.

4. The machine tool of claim 3, wherein the movement of said table surface is computer controlled.

5. The machine tool of claim 4, wherein the movement of said table is synchronized with the movements of said machining means on said at least one spindle unit.

6. The machine tool assembly of claim 1 wherein said machining means is easily convertible to perform various types of machining processes.

7. The machine tool assembly of claim 1 wherein said machining means includes a modular tool magazine.

8. The machine tool assembly of claim 1 wherein said base has a plurality of apertures in said top surface, said support unit removably attachable to said base by insertion of said leg portion into at least one of said apertures.

9. The machine tool assembly of claim 1 wherein said support unit includes a guideway along its body portion, said spindle unit being movably attachable along said guideway.

10. The machine tool assembly of claim 1 wherein said support unit is generally perpendicular to said base, said leg portion being at least one leg and said body portion has a curvilinear form over said table.

11. The machine tool assembly of claim 1 wherein said support unit is generally parallel to said base, said leg portion being a plurality of legs and said body portion has a generally curvilinear form about said table.

12. The machine tool assembly of claim 10 wherein said support unit includes pivot means in said leg portion to allow said body portion to rotate about said pivot means relative to said base.

13. A machine tool assembly for machining a workpiece, said machine tool assembly comprising:

a base having a top surface;

means for securing the workpiece relative to said base;

at least one horizontal support unit having a horizontal body portion and a leg portion, said horizontal body portion defining a horizontal curvilinear path with a groove therealong, said horizontal path being generally centered about said securing means, said horizontal support unit removably attachable to said base in a plurality of locations so that said machine tool assembly is easily reconfigurable to perform multiple tasks on the workpieces;

at least one vertical support unit having a body portion and a leg portion, said body portion defining a curvilinear path in a substantially vertical plane and including a groove therealong, said vertical path being generally centered about said securing means, said vertical support unit removably attachable to said base in a plurality of locations so that said machine tool assembly is easily reconfigurable to perform multiple tasks on the workpieces; and at least one spindle unit, said spindle unit being movably attachable within said grooves along said horizontal and vertical support units so that said spindle unit is movable to any location along each of said grooves, said spindle unit including a rotatable end that rotates about a single axis and has means for performing a machining process attached thereto, said rotatable end being linearly movable along said axis of rotation during operation of said spindle unit, said spindle unit being computer controlled to perform the desired machining process on the workpiece.

14. A machine tool assembly for machining a workpiece, or performing a series of operations, said machine tool assembly comprising:

a base having a top surface;

means for securing the workpieces relative to said base;

at least one support unit having a body portion and a leg portion, said support unit removably attachable to said base at a plurality of locations on said top surface thereby defining a first support degree of freedom; and at least one spindle unit, said spindle unit being movably attachable to said support unit so that said spindle unit is movable relative to said support unit thereby defining a second degree of freedom, said spindle unit including means for performing a machining process on the workpiece.

15. The machine tool assembly of claim 14, wherein said second degree of freedom enables said spindle unit to be set at a desired position along said support unit in a continuously variable manner.

16. The machine tool assembly of claim 14, wherein said at least one movably attachable unit is reoriented manually, so that said second degree of freedom is passive.

17. The machine tool assembly of claim 14, wherein said at least one movably attachable unit is reoriented through an actuator means, so that said second degree of freedom is active.

18. The machine tool assembly of claim 16, wherein said second degree of freedom is convertible to an active degree of freedom.

19. The machine tool assembly of claim 17, wherein said second degree of freedom is convertible to a passive degree of freedom.

* * * * *